Figure 1:
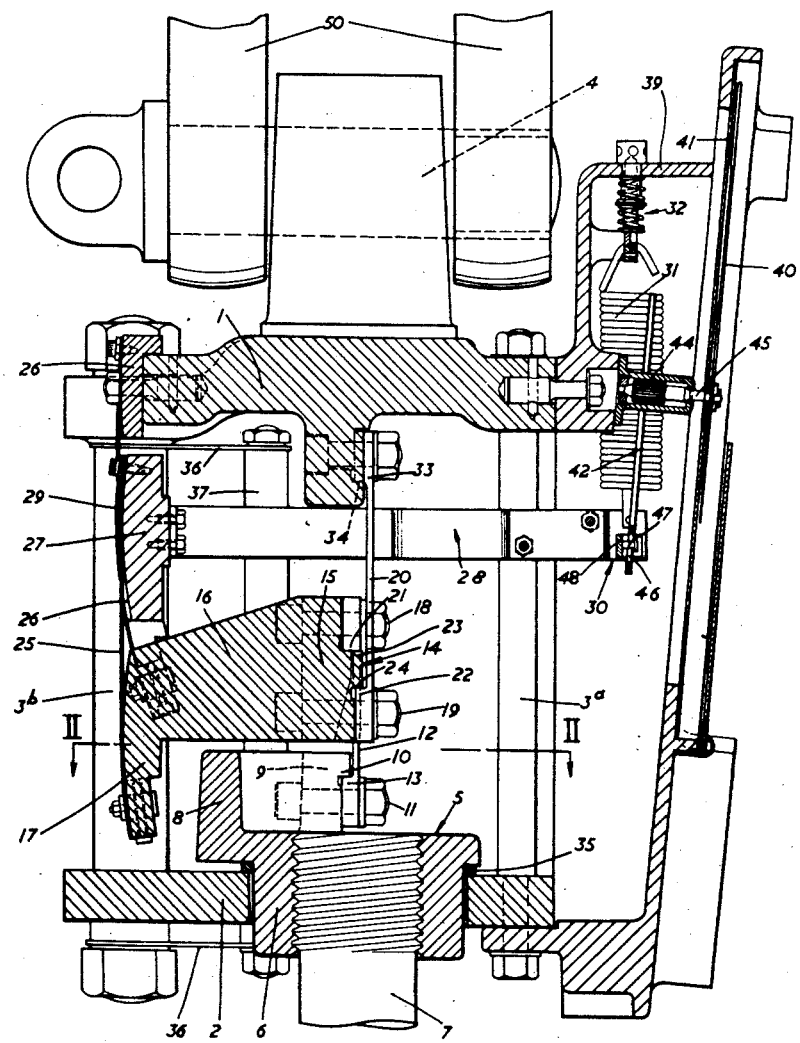

Jan. 15, 1963

J. K. BACHE 3,073,403

WEIGHING DEVICES FOR SUSPENDED LOADS

Filed Nov. 9, 1959

Inventor
J. K. Bache
By Richards & Geier
Attorneys

Jan. 15, 1963　　　J. K. BACHE　　　3,073,403
WEIGHING DEVICES FOR SUSPENDED LOADS
Filed Nov. 9, 1959　　　　　　　　　　　　　5 Sheets-Sheet 4

Inventor
J. K. Bache
By Richards y Geier
Attorneys

Jan. 15, 1963  J. K. BACHE  3,073,403
WEIGHING DEVICES FOR SUSPENDED LOADS
Filed Nov. 9, 1959  5 Sheets-Sheet 5
FIG.5.
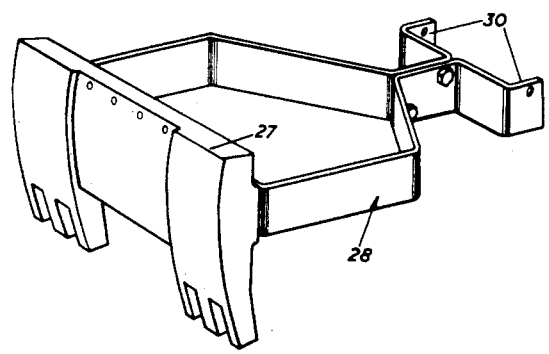
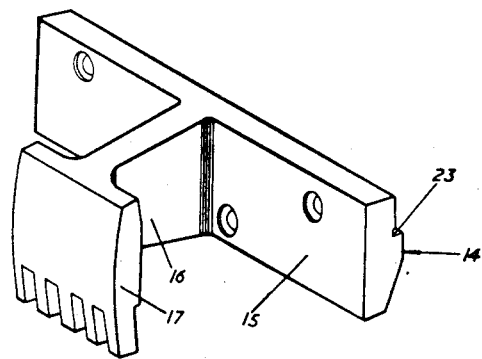
Inventor
J. K. Bache
By Richards & Geier
Attorneys United States Patent Office 3,073,403
Patented Jan. 15, 1963

3,073,403
WEIGHING DEVICES FOR SUSPENDED LOADS
John Kenneth Bache, Blakeshall, England, assignor to George Salter & Co. Limited, West Bromwich, England, a company of Great Britain
Filed Nov. 9, 1959, Ser. No. 851,781
Claims priority, application Great Britain Nov. 14, 1958
12 Claims. (Cl. 177—147)

This invention relates to weighing devices intended for measuring suspended loads and is particularly applicable to heavy duty apparatus such as crane weighing devices for measuring loads picked up by a crane.

An object of the invention is to provide an improved construction of weighing device suitable for large suspended loads which enables the load to be balanced by relatively weak load-resisting means.

According to the invention, in a weighing device for measuring suspended loads in which a vertically-movable load-supporting member is coupled to resilient load-balancing means through a lever system whereby a small force produced by the resilient load-balancing means is sufficient to balance a relative large load, said lever system including at least one "load-reducing" arrangement comprising an elongated load-transmitting tensile member, an elongated load-reaction tensile member anchored at one end to a rigid frame member of the device and extending effectively in a direction substantially parallel to said elongated load-transmitting tensile member, a common movable intermediate part joining or effectively engaging at two spaced points said load-transmitting member and load-reaction member respectively, and a lever arm associated with, and movable with, said intermediate part, which lever arm is operatively coupled to the resilient load-balancing means, the arrangement being such that application of a load to the vertically-movable load-supporting member subjects said load-transmitting tensile member and load-reaction tensile member to tensile stress whereby said intermediate part and associated lever arm are caused to be angularly deflected in a plane extending in the same general direction as the lever arm.

The invention also comprises a weighing device for measuring suspended loads comprising a vertically-movable load supporting member, and a "load-reducing" arrangement operatively connected to resilient load balancing means, said "load-reducing" arrangement including a load-influenced lever member which is floatingly suspended by a depending bar or blade anchored to a fixed frame member and which is acted upon through a vertical load-transmitting bar or blade connected to the vertically-movable load supporting member and offset with respect to the depending suspension bar or blade so that the lever member is subjected to a turning couple and is angularly deflected by application of a load to the load supporting member, the effective length of said lever member being large compared to the relative offset distance of the suspension bar or blade and the load transmitting bar or blade whereby a large load can be balanced by a relatively small force produced by the resilient load-balancing means.

In order to obtain the desired ratio between the load and the balancing force of the resilient load-resisting means, two or more of the said "load-reducing" arrangements may be provided in series between the load-supporting member and the load-resisting means.

The invention further comprises a weighing device for measuring suspended loads comprising a vertically-movable load-supporting member coupled to a load-balancing spring means and to indicating mechanism through a lever system including first and second "load-reducing" arrangements whereby a small force produced by the load-balancing means is sufficient to balance a relatively large load, said first "load-reducing" arrangement comprising a plurality of upstanding load-transmitting vertical bars or blades joined at their upper ends by a first intermediate part rigid with a first lever arm to the lower ends of a plurality of vertical suspension bars or blades securely anchored at their upper ends to the rigd frame, said load-transmitting bars or blades and suspension bars or blades are offset so that under tensile stress set up by an applied load a turning moment is imparted to said first intermediate part causing it and said first lever arm to be angularly deflected, and said second "load-reducing" arrangement comprising a plurality of lower downwardly-extending blade springs secured at their lower ends to the outer end of said first lever arm and joined at their upper ends by a second intermediate part rigid with a second lever arm to a plurality of offset, downwardly-extending upper blade springs anchored at their upper ends to a rigid frame member, whereby under tensile stress created by angular deflection of said first lever arm, a turning couple is imparted to said second intermediate part causing it and said second lever arm to be angularly deflected which movement is resisted by said load-balancing spring means which is operatively connected to the outer end of said second lever arm.

Figure 2:
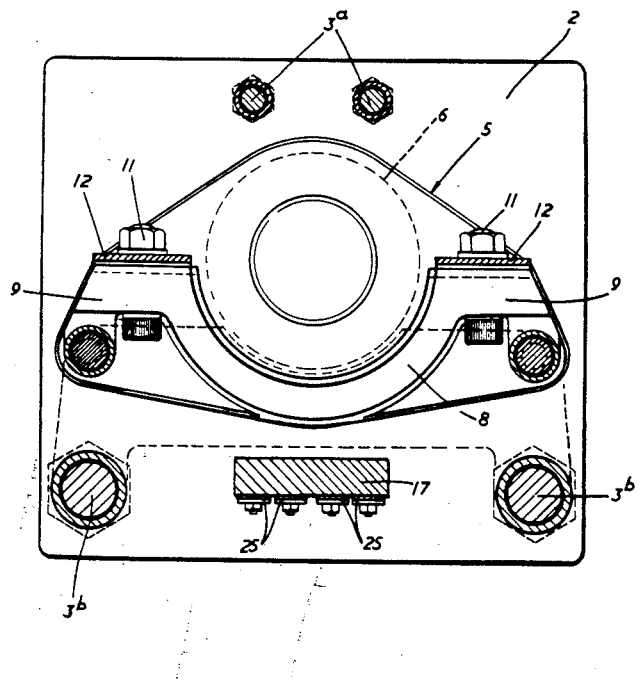
Figure 3:
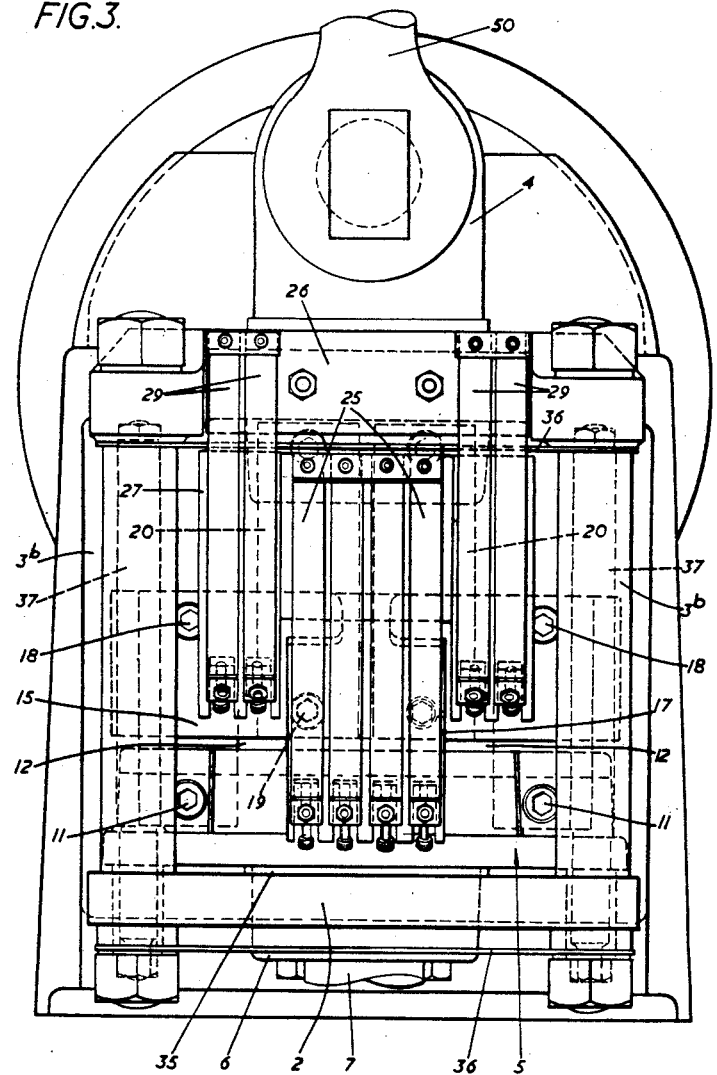
Figure 4:
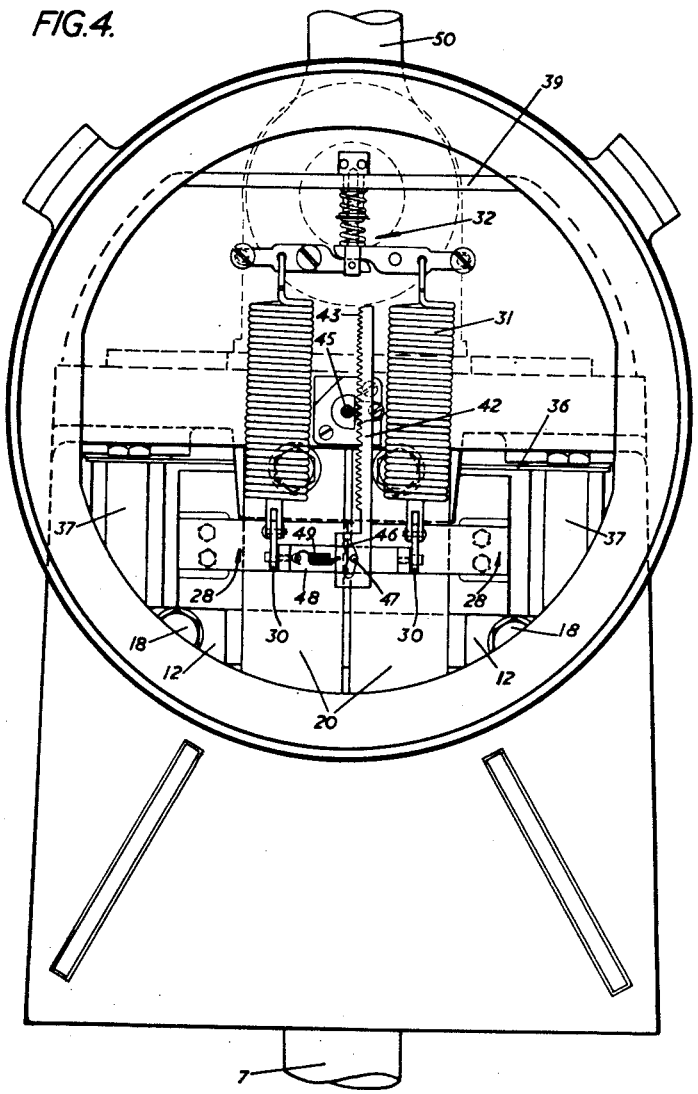

The invention will be more particularly described in connection with a specific exemplary embodiment in the form of a heavy duty weighing device intended to be carried by a crane in order to indicate the weight of loads which may be several tons. Said embodiment is illustrated in the accompanying drawings in which:

FIGURE 1 is a verical section through the device;
FIGURE 2 is a horizontal section on line II—II of FIGURE 1;
FIGURE 3 is a rear elevational view;
FIGURE 4 is a front view with part of the indicating mechanism removed; and
FIGURE 5 is a perspective view of two internal parts of the device shown approximately in their correct relative positions.

Referring to the drawings, the weighing device has an open box-like frame comprising heavy upper and lower plates, 1 and 2 respectively, spaced from one another and rigidly secured together by front and rear vertical pillars or posts 3ᵃ and 3ᵇ respectively. The upper plate 1 carries on its upper side an upstanding apertured bracket or eye 4 for engagement with a suspended shackle 50 carried by the crane.

The load is intended to be carried by a vertically-movable load-supporting member 5 comprising a casting having a central depending stem 6 which passes down through a clearance hole in the lower frame plate 2 and carries a hook member 7 (shown in part) for attaching the load. The casting of this load supporting member 5 is formed with an upstanding wall 8 of bowed form (see FIGURE 2), the two diametrically-aligned end portions 9, 9, of which having vertical side faces recessed to provide abutments or shoulders 10. Rigidly secured by bolts 11 to each of these end portions 9, 9 is an upstanding load-transmitting flat bar 12 the lower end of which is thickened to form a shoulder 13 which engages the corresponding abutment or shoulder 10 so that the load force on the load-supporting member 5 is transmitted directly to the respective bars 12 without imposing an undesirable high loading on the bolts 11.

The upper ends of these load-transmitting bars 12 are rigidly secured by bolts 18 to a side face 14 of a rigid transversely-extending block constituting an intermediate part 15 which is formed with an integral lever arm 16 extending laterally and carrying an enlarged head portion 17 at its outer end (see FIGURE 5). Also, secured by bolts 19 to the side face 14 of the block forming the intermediate part 15, in between the upper ends of the two bars 12, are the lower ends of two upper vertical flat bars 20, 20, which are rigidly anchored at the top to the upper fixed plate 1 of the frame, and which constitute load-reaction tensile members serving to floatingly support or suspend the intermediate part 15. The lower bars 12, 12 are thus joined to the upper bars 20, 20, by the intermediate part 15.

In order to prevent an undesirable high loading of the securing bolts 18 and 19, upper and lower ends of the bars 12 and 20 respectively are thickened to provide shoulders 21 and 22 which engage shoulders or abutments 23 and 24 integrally formed on the face 14 of the intermediate part 15, thereby providing a method of attachment similar to the hereinbefore described attachment of the bars 12 to the load-supporting member 5. Similarly, the upper ends of bars 20 have integral shoulders 33 engaging a shoulder or abutment 34 on the upper frame plate 1.

As will be evident from FIGURE 1 the upper bars 20 and their effective points of connection to the intermediate part 15 are spaced apart and offset from the lower bars 12 and the points of connection of the latter to the intermediate connecting part 15. Thus, when in use a load is suspended from the vertically-movable load-supporting member 5 which carries the lower bars 12, on account of the out-of-line lower and upper bars 12 and 20, a turning couple or torque is exerted on the intermediate part 15, causing it and the integral lever arm 16 to be angularly deflected the bars 12 and 20 flexing slightly to accommodate this deflection. The length of this lever arm 16, however, is large compared to the distance by which the upper and lower bars 12 and 20 are offset from one another and the turning couple or torque produced by the action of the load on the intermediate part 15 can be balanced by a very much smaller resisting force applied to the outer end 17 of the lever arm 16. The offset bars 12 and 20 and lever carrying intermediate part 15 may therefore be termed a first "load-reducing" arrangement.

It will be noted that the effective points of engagement with the intermediate part 15 of the lower load-transmitting bars 12, 12 are above those of the upper load-reaction bars 20, 20 so that as the intermediate part 15 and associated lever arm 16 are deflected angularly from their normal position by a load, the offset distance of the bars 12, 12 and 20, 20 tends to increase and for constant tensile forces in said bars, the turning couple exerted will tend to increase, thus counteracting the effect of the stiffness of bars 12 and 20.

In order to reduce further the force necessary to balance the load, the outer headed end 17 of the lever arm 16 is coupled to a second "load-reducing" arrangement which is similar in principle to that hereinabove described. Thus, rigidly secured to the end face of the headed end 17 of said lever arm 16 is a set of upwardly-extending blade members 25 which in this case are formed of spring steel strip. Conveniently, four such spring strip blade members are provided, as shown in FIGURE 3, and they are all aligned side-by-side in the same substantially vertical plate. Their upper ends are secured to the end face of a block forming a second intermediate part 27 carrying a horizontally-extending operating lever arm 28 the free end 30 of which is connected to resilient load-balancing means and to a built-in indicating mechanism as hereinafter described.

This operating lever arm 28 and intermediate part 27 are floatingly supported by a set of upper blade members 29 which are also in the form of spring steel strips having their lower ends secured to the aforesaid end face of the intermediate part 27 and their upper ends securely anchored to a fixed frame member 26 secured to the upper plate 1. These upper blade members 29 are aligned laterally and are arranged in two pairs, at either side of the lower blade members 25 (see FIGURE 3). The blade members 29 are effectively offset, however, in relation to the lower blade members 25, to which they are joined by the intermediate part 27, so that they effectively act upon the end of the intermediate part 27 in a plane parallel but spaced from the plane in which the lower blade members 25 act, and when the latter are urged downwards by the effect of a load acting through the first "load-reducing" arrangement a turning couple or torque is exerted on said second intermediate part 27 and associated lever 28 tending to deflect the latter angularly in a clockwise direction when viewed as in FIGURE 1. Again, the distance by which the upper blade members 29 of this second "load-reducing" arrangement are offset from the lower blade members 25 is small in comparison with the effective length of the operating lever 28, and hence the turning couple or torque exerted through the tensile forces in the blade members 25 and 29 can be balanced by a relatively small force applied at the end 30 of the lever 28.

As is clearly shown in FIGURE 5, the lever 28 has a composite construction, and as shown in FIGURE 4, the outer end 30 which is forked is connected directly to the lower ends of two depending coiled extension springs 31, 31 forming the resilient load-balancing means. The upper ends of the springs 31, 31 are connected through an adjusting device 32 to a fixed frame member 39. With the leverage obtained by means of the "load-reducing" arrangements, however, the magnitude of the restoring or balancing force produced by the springs 31, 31 may be relatively weak, being of the order of pounds, for example, in order to balance a load of several tons.

On account of the leverage of the "load-reducing" arrangements, the movement of the outer end 30 of the operating lever 28 is very much greater than that of the load-supporting member 5, and in this particular embodiment a movement of the load-supporting member of a few thousandths of an inch may be sufficient to produce a convenient deflection of the lever 28. The lower surface of the main casting forming the load-supporting member 5, adjacent the stem 6, need therefore only be separated from the surface of the lower frame plate 2 by a small clearance, and as shown in FIGURE 1, this clearance space contains a cushioning ring 35 which prevents an excessive displacement produced by an overload, thereby ensuring that no damage can be caused to the weighing mechanism.

The load supporting member is guided so as to always move in a vertical direction by means of two vertically spaced, parallel blade springs 36, 36, of equal length which are anchored at their one end to the frame pillars or posts 3ᵇ, and at their other end to rigid vertical guide posts 37 carried by the load-supporting member.

The indicating mechanism comprises a pivoted pointer 40 arranged to move over a circular graduated scale 41 and operated through a rack and pinion arrangement, an upstanding bar 42 coupled to the outer end 30 of the operating lever 28 being provided with rack teeth 43 arranged to co-operate with a pinion 44 on a spindle or shaft 45 carrying the pointer 40.

As shown in FIGURE 4, the lower end of the rack bar 42 is formed with a V-shaped slot 46 in which is engaged a pin 47 carried by a cross-member 48 attached to the forked end 30 of the lever 28. A spring 49 anchored to the cross-member 48 and connected to the lower end of the rack-bar 42 keeps the pin 47 normally engaged in the bend or elbow of the slot 46, and in normal use the relative positions of pin 47 and slot 46 will remain the same so that the rack bar 42 follows faithfully the up and down movement of the end of the lever 28. In the event of a sudden shock loading of the device, the restraining action of the spring 49 will be overcome and the pin 47 will ride up or down the inclined sides of the slot 46, thereby preventing the positive transmission of shock forces to the indicating mechanism which are likely to cause damage.

Although one specific embodiment has been described by way of example, many modifications in the specific constructional details may clearly be made within the scope of the invention which is defined in the appended claims.

I claim:

1. A weighing device for measuring suspended loads comprising a rigid frame, a vertically-movable load-supporting member mounted in said frame, resilient load-balancing means carried by said frame, an elongated load-transmitting tensile member in the form of a resiliently flexible blade, an elongated load-reaction tensile member also in the form of a resiliently flexible blade which is anchored at one end to said rigid frame and which is substantially parallel to, but offset and longitudinally displaced from, said load-transmitting blade, an intermediate part suspended from the free end of said load-reaction blade and firmly connected with an adjacent opposed end of said load-transmitting blade, and a lever arm rigid with said intermediate part and extending away from the planes containing said blade members, said lever arm being operatively coupled to the resilient load-balancing means and its length being relatively large compared with the distance by which the said blade members are offset from one another, and said lever arm and intermediate part together being freely suspended and angularly movable under the influence of tensile stress in said blade members produced by the application of a load to said vertically-movable load-supporting member the angular movement being accommodated by resilient flexing of said blade members and forming, with said blade members, essential components of a load-reducing lever system through which is transmitted the effect of the load from the vertically-movable load-supporting member to the resilient load-balancing means, whereby a small force produced by the load-balancing means is sufficient to balance a relatively large load.

2. A weighing device for measuring suspended loads comprising a rigid frame, a vertically-movable load-supporting member mounted in said frame, resilient load-balancing means carried by said frame, an elongated load-transmitting tensile member in the form of a vertical resiliently flexible blade rigidly connected at its lower end to said load-supporting member, an elongated load-reaction tensile member also in the form of a vertical resiliently flexible blade anchored at its upper end to said rigid frame and offset in a substantially parallel plane with respect to said load-transmitting blade member, an intermediate part suspended from the lower end of said load-reaction blade member and firmly connected with the upper end of said load-transmitting blade member, which respective lower and upper ends effectively overlap, and a lever arm rigid with said intermediate part and extending away from the planes containing said blade members, said lever arm being operatively coupled to the resilient load-balancing means and its length being relatively large compared with the distance by which the said blade members are offset from one another, and said lever arm and intermediate part together being freely suspended and angularly movable under the influence of tensile stress in said blade members produced by the application of a load to said vertically-movable load-supporting member the angular movement being accommodated by resilient flexing of said blade members and forming, with said blade members, essential components of a load-reducing lever system through which is transmitted the effect of the load from the vertically-movable load-supporting member to the resilient load-balancing means, whereby a small force produced by the load-balancing means is sufficient to balance a relatively large load.

3. A weighing device for measuring suspended loads according to claim 2, wherein integral shoulders are carried by said intermediate part and by the respective ends of said load-transmitting blade member and said load-reaction blade member, said integral shoulders of the blade members engaging the integral shoulders of the intermediate part whereby the loading forces are transmitted directly therethrough between said intermediate part and said blade members.

4. A weighing device for measuring suspended loads comprising a rigid frame, a vertically-movable load-supporting member mounted in said frame, resilient load-balancing means carried by said frame, a plurality of elongated load-transmitting tensile members in the form of vertical resiliently flexible blades, a plurality of elongated load-reaction tensile members also in the form of vertical resiliently flexible blades which are anchored at their one end to said rigid frame and which are substantially parallel to, but offset and longitudinally displaced from, said load-transmitting blades, an intermediate part suspended from the free ends of said load-reaction blade members and firmly connected with adjacent opposed ends of said load-transmitting blade members, which respective opposed ends effectively overlap, and a lever arm rigid with said intermediate part and extending away from the planes containing said blade members, said lever arm being operatively coupled to the resilient load-balancing means and its length being relatively large compared with the distance by which the said blade members are offset from one another, and said lever arm and intermediate part together being freely suspended and angularly movable under the influence of tensile stress in said blade members produced by the application of a load to said vertically-movable load-supporting member the angular movement being accommodated by resilient flexing of said blade members and forming, with said blade members, essential components of a load-reducing lever system through which is transmitted the effect of the load from the vertically-movable load-supporting member to the resilient load-balancing means, whereby a small force produced by the load-balancing means is sufficient to balance a relatively large load.

5. A weighing device for suspended loads comprising a rigid frame, a vertically-movable load-supporting member, a load-reducing arrangement, and resilient load-balancing means operatively connected to said load-reducing arrangement, said load-reducing arrangement including a load-influenced lever member, a set of depending blades anchored at their upper ends to said frame and carrying said lever member, said lever member being suspended from said blade, a set of vertical load-transmitting blades connected to the vertically-movable load-supporting member at their lower ends and engaged at their upper ends with said lever member, the blades of said sets of lever-supporting blades and of said load-transmitting blades respectively being effectively offset from each other in parallel planes whereby said lever member is subjected to a turning couple and is angularly deflected by application of a load to said load-supporting member, the effective length of said lever member being large compared to the relative offset distances of the lever-supporting blades and load-transmitting blades whereby a large load can be balanced by a relatively small force produced by the resilient load-balancing means.

6. A weighing device for suspended loads comprising a rigid frame, a vertically-movable load-supporting member mounted in said frame, a first load-reducing arrangement including a first load-influenced lever member, a first load-reaction tensile member in the form of a depending bar anchored at its upper end to said frame and floatingly supporting said first lever member, a first load-transmitting tensile member in the form of a vertical bar connected to the vertically-movable load-supporting member at its lower end and engaged at its upper end with said first lever member, said first load-reaction tensile member and first load-transmitting tensile member being disposed out of alignment and offset from each other whereby said first lever member is subjected to a turning couple and is angularly deflected by application of a load to said load-supporting member, the effective length of said first lever member being large compared to the relative offset distance of said first load-reaction member and first load-transmitting member, a second load-reducing arrangement including a second load-influenced lever member, a second load-reaction tensile member in the form of a depending blade anchored at its upper end to said frame and floatingly supporting said second lever member, a second load-transmitting tensile member in the form of a depending blade connected at its upper end to said second lever member and at its lower end to the outer end of the aforesaid first load-influenced lever member, said second load-reaction tensile member and second load-transmitting tensile member being disposed out of alignment and offset from each other whereby said second lever member is subjected to a turning couple and is angularly deflected by angular deflection of said first lever member, the effective length of said second lever member being large compared to the relative offset distance of said second load-reaction member and second load-transmitting member, and resilient load-balancing means operatively connected to the outer end of said second load-influenced lever member, said first and second load-reducing arrangements thus being effectively in series between the vertically-movable load-supporting member and the resilient load-balancing means, whereby a large load can be balanced by a relatively small force produced by said resilient load-balancing means.

7. A weighing device for suspended loads according to claim 6, in which said resilient load-balancing means comprises at least one coiled extension spring.

8. A weighing device for measuring suspended loads according to claim 6 further comprising built-in indicating means connected to the outer end of said second load-influenced lever member.

9. A weighing device for measuring suspended loads comprising a rigid frame, a vertically movable load-supporting member mounted in said frame, resilient load-balancing means carried by said frame, a vertically depending elongated resiliently flexible load-transmitting tensile member having a lower end which is rigidly connected to said load-supporting member, a vertically depending elongated resiliently flexible load-reaction tensile member having an upper end securely anchored to said rigid frame, said load-transmitting and said load-reaction tensile members being offset laterally from one another and extending parallel to each other, a common intermediate part rigidly connected to the upper end of said load-transmitting tensile member and suspended from the lower end of said load-reaction member, whereby said intermediate part is angularly movable under the influence of tensile stress in said load-transmitting and said load-reaction tensile members produced by application of a load to the load-supporting member, the angular movement being accommodated by resilient flexing of said tensile members, and a lever arm movable with said intermediate part and operatively coupled to the resilient load-balancing means; said load-transmitting tensile member, load-reaction tensile member, intermediate part and lever arm forming essential components of a load-reducing lever system through which is transmitted the effect of the load from the vertically movable load-supporting member to the resilient load-balancing means, the effective length of the lever arm being substantially larger than the lateral offset distance between the load-transmitting member and the load-reaction member, whereby a small force produced by the load-balancing means is sufficient to balance a relatively large load.

10. A weighing device for measuring suspended loads comprising a rigid frame, a movable load-supporting member mounted in said frame, resilient load-balancing means carried by said frame, and at least one load-reducing lever system through which said movable load-supporting member is coupled to said resilient load-balancing means whereby a small force produced by the latter is sufficient to balance a relatively large load, said load-reducing system including a lever, a resiliently flexible, elongated load-reaction tensile member rigidly secured at one end to said frame and carrying said lever, said lever being freely suspended from said load-reaction tensile member, and a resiliently flexible, elongated load-transmitting tensile member rigidly secured at one end to said lever and rigidly secured at its other end to said movable load-supporting member, said elongated load-reaction and load-transmitting tensile members respectively engaging the lever at two points effectively spaced apart by a distance which is small relative to the effective length of the lever, angular movement of the lever under the effect of a load applied to the load-supporting member being accommodated by the resilient flexing of said tensile members.

11. A weighing device for measuring suspended loads according to claim 10, comprising inter-engaging integral abutments on the ends of said tensile members, on said lever, and on said load-supporting member for the direct transmission of the load force.

12. A weighing device for measuring suspended loads according to claim 11, in which the lever comprises a lever arm operatively coupled at one end to the resilient load-balancing means, and a transversely extending part carried by an opposite end of said lever arm, said transversely-extending part having a profiled exterior face to which are secured said load-reaction and load-transmitting tensile members.

References Cited in the file of this patent

UNITED STATES PATENTS

| 278,912 | Emery | June 5, 1883 |
| 1,424,239 | Conti | Aug. 1, 1922 |
| 2,622,938 | Duyn | Dec. 23, 1952 |

FOREIGN PATENTS

| 409,810 | Germany | Feb. 12, 1925 |
| 953,018 | Germany | Nov. 22, 1956 |